(12) United States Patent
Obee et al.

(10) Patent No.: US 6,997,588 B2
(45) Date of Patent: Feb. 14, 2006

(54) ILLUMINATION AND/OR INDICATING DEVICE FOR A VEHICLE COMPRISING A MASK

(75) Inventors: Philippe Obee, Bobigny Cedex (FR);
Marc Dejardin, Bobigny Cedex (FR);
Cyril Herbin, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 116 days.

(21) Appl. No.: 10/452,022

(22) Filed: May 30, 2003

(65) Prior Publication Data
US 2004/0042230 A1 Mar. 4, 2004

(30) Foreign Application Priority Data
May 31, 2002 (FR) .................................. 02 06755

(51) Int. Cl.
*F21V 7/00* (2006.01)

(52) U.S. Cl. ....................................... 362/516; 362/539

(58) Field of Classification Search ........ 362/516–518, 362/539, 540, 351
See application file for complete search history.

(56) References Cited

U.S. PATENT DOCUMENTS

| | | | | |
|---|---|---|---|---|
| 5,546,284 A | * | 8/1996 | Harada | 362/487 |
| 5,879,073 A | * | 3/1999 | Hori et al. | 362/344 |
| 6,019,492 A | * | 2/2000 | Ikegaya et al. | 362/521 |
| 6,267,488 B1 | | 7/2001 | Muegge et al. | 462/509 |

FOREIGN PATENT DOCUMENTS

| | | |
|---|---|---|
| EP | 1004473 A2 | 5/2000 |
| EP | 1110813 A2 | 6/2001 |
| FR | 2732748 | 10/1996 |

OTHER PUBLICATIONS

French Patent Search Report, FA 621476 FR 0206755, S. Aubard, Feb. 3, 2003.

* cited by examiner

*Primary Examiner*—Ali Alavi
(74) *Attorney, Agent, or Firm*—Morgan & Finnegan, LLP

(57) ABSTRACT

The object of the invention is an illumination and/or indicating device for a vehicle comprising a mask constituting the perimeter of the side walls of at least two cavities intended to house at least one bulb in each of them. Said mask comprises at least two parts mechanically fixed to one another, preferably so as to be removable, at least one extending as a reflector or a portion of reflector.

20 Claims, 3 Drawing Sheets

Figure 2A:
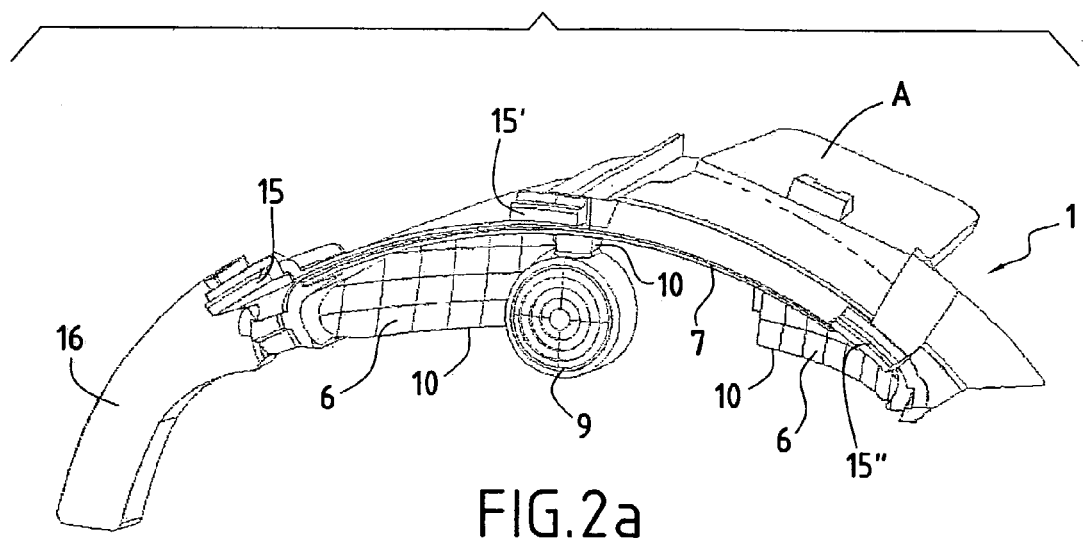

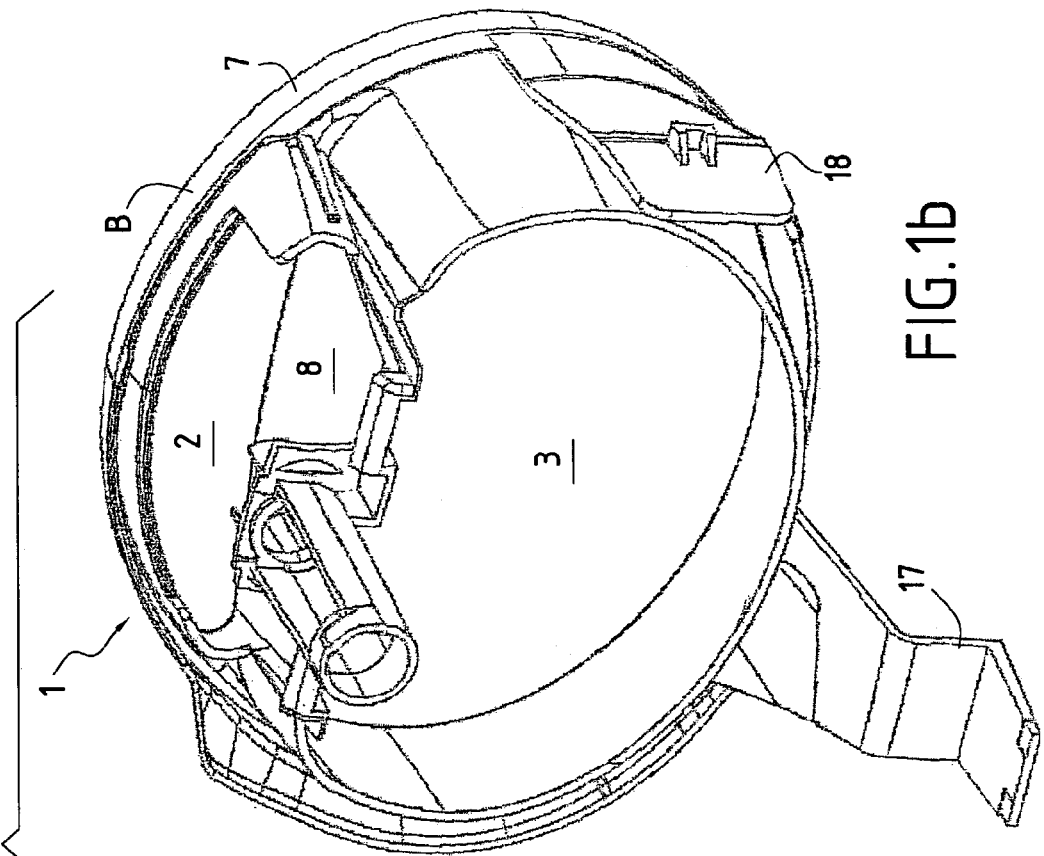
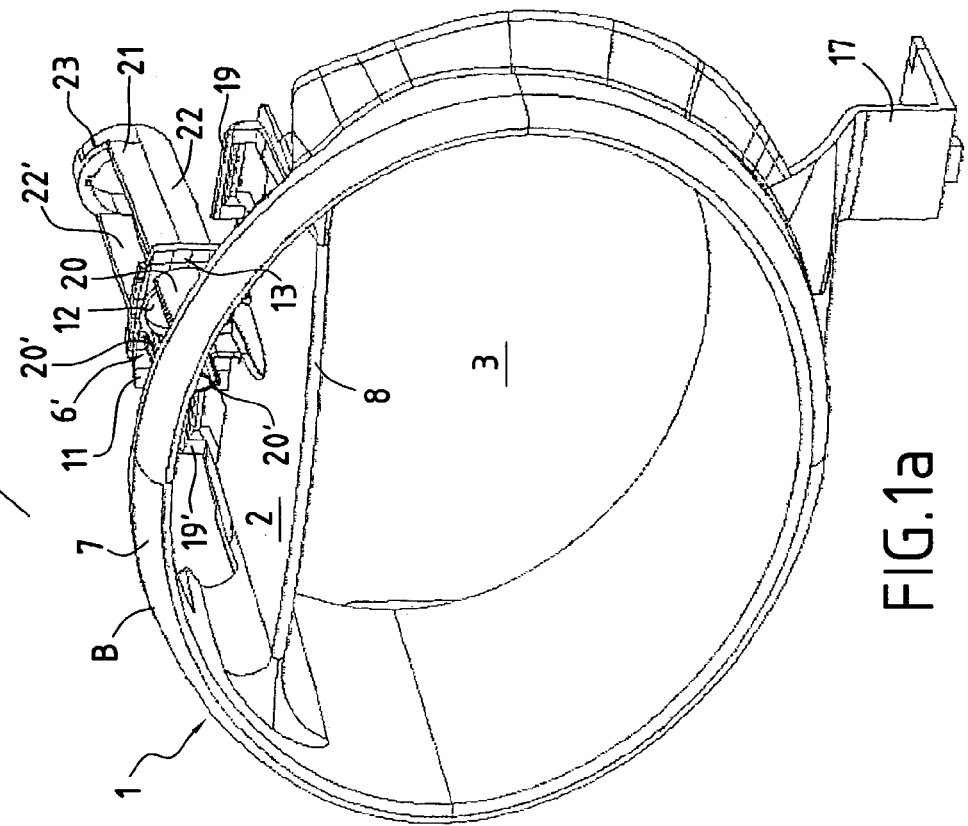

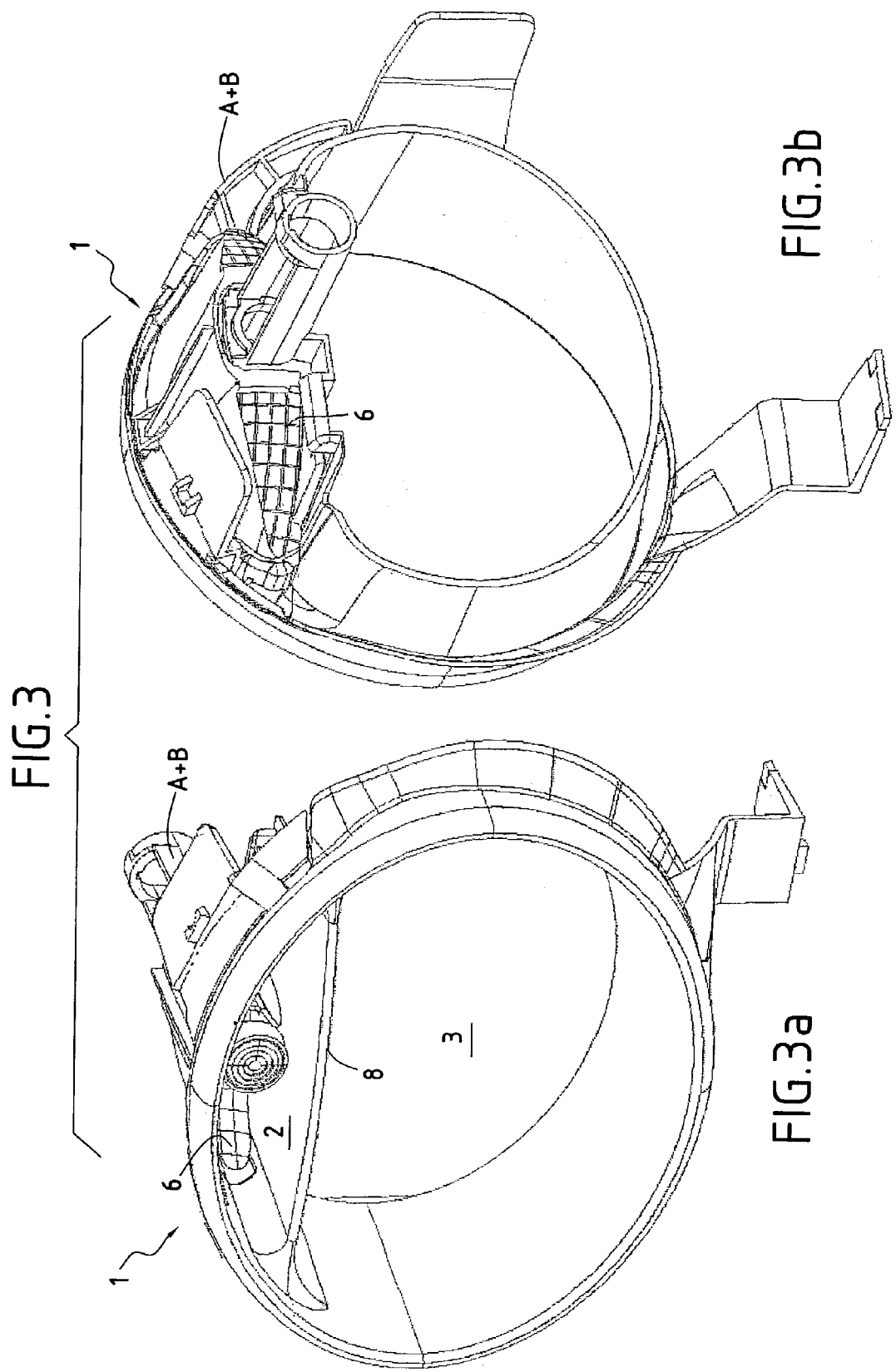

ILLUMINATION AND/OR INDICATING DEVICE FOR A VEHICLE COMPRISING A MASK

The object of the present invention is an illumination and/or indicating device for a motor vehicle.

The field of the invention is, in general terms, that of motor vehicle lamps. In this field, different types of function are known, amongst which there are in particular:

- sidelights ("town lights"), of low intensity and range;
- turn signal lights (flasher units);
- low beam, or dipped beam, headlights, of stronger intensity and with a range on the road close to 70 meters, which are used mainly at night and whose light beam distribution is such that it makes it possible to not dazzle the driver of an oncoming vehicle;
- high beam headlights, and additional long-range type lights, whose field of vision on the road is close to 200 meters, and which must be switched off when another vehicle is oncoming in order to not dazzle its driver;
- fog lights, lights referred to as daytime lights, etc.

Certain advanced lamps are known, referred to as dual-mode lamps, which combine the low beam headlight and high beam headlight functions using a single bulb and a removable screen.

The device according to the invention is intended to combine several of these lights in a single housing. The invention is concerned more particularly, without limiting itself thereto, with lamps which use a housing where several adjacent cavities are disposed, each of said cavities being equipped with one or more bulbs in order to fulfil several functions. By way of example, there can be two cavities, one for illumination and equipped with a bulb for high beam/low beam headlights, the other cavity being reserved for indicating with a town light or a flasher unit.

It is known that these cavities have walls forming a reflector, walls where the far end has an opening made in it in order to make it possible to introduce and possibly fix the bulb into said cavities. It is also known to extend towards the front these walls forming reflectors by side walls which will define the visible perimeter of the cavities. These walls do not have the optical function of reflectors; they are there in order to "clothe" these cavities, in order to give an impression of continuity between the reflectors and the closure glass which will close off these cavities. Usually, these masks are moulded in a single piece and then, like the reflectors, they must undergo a step of surface treatment of the metallisation type.

This metallisation step is difficult, inasmuch as a coating which is homogeneous in appearance, indeed continuous, is required. The deeper the pieces to be metallised, the more difficult this homogeneity of appearance is to obtain. This is the reason why simultaneously metallising the masks and the associated reflectors is difficult, when the cavities thus created are much deeper than they are high.

It can also be required to add additional functionalities to the reflectors, in particular to fix to them elements of the style occulter type (that is to say a component which for aesthetic reasons occults the top of the bulb, perhaps even makes it entirely or almost entirely non-visible), of screen type (in particular in order to prevent part of the light beam emitted by the bulb in question striking the mask and there creating stray reflected rays) or else an element for modifying the light beam or modifying its appearance, of the Fresnel lens type. These additional elements are also liable to interfere with the metallisation step.

The aim of the invention is in that case to design a new type of mask capable of integrating several functionalities, besides its prime function of a mask. Secondarily, it concerns making a mask intended to equip several cavities provided with at least one bulb each, including in particular one cavity dedicated essentially to illumination and the other cavity to indicating, and designing a mask which is easy to produce, aesthetic, which can be metallised satisfactorily and can be adapted easily.

First of all the object of the invention is an illumination and/or indicating device for a vehicle comprising a mask constituting the perimeter of the side walls of at least two cavities intended to house at least one bulb in each of them. This mask comprises at least two parts (A, B) mechanically fixed to one another, preferably so as to be removable, at least one (A) extending as a reflector or a portion of reflector.

Using a mask made in at least two complementary parts is advantageous for various reasons: first of all, the appearance of the different parts of the mask can be differentiated, by choosing, for each of the parts, differentiated surface treatments for example, which is aesthetically advantageous. Next, the possible difficulty of surface treating (by a metallisation type treatment) a mask made in one piece and fairly deep can thus be circumvented: each mask part can be metallised separately, which makes it possible to guarantee satisfactory metallisation through better accessibility of the surfaces to be treated. At the same time, making the mask fulfil other functionalities can then be envisaged, without being penalised in terms of surface treatment quality. This is the reason why one of the parts of the mask according to the invention extends as a reflector: it is advantageous to thus have a reflector carried by the mask, inasmuch as it is not always possible or easy to envisage fixing the reflector to the housing.

Advantageously, the means of fixing the parts (A, B) of the mask to one another form an integral part of said parts (A, B), by a clipping system, in particular invisible once the mask is mounted in said device. The advantage of masking these fixings is twofold: on the one hand, it is aesthetic; the impression can thus be given that the mask is in fact made in one part. The advantage is also technical: by providing clipping which is invisible once the lamp is complete (in particular by clipping at the rear of the cavities, in the "rear" areas of the mask parts, that is to say the areas which will be hidden by the housing once the device is mounted), it is possible to bring the two mask parts close together during the clipping operation without risking scratching the areas of the mask which will be visible once the lamp is complete.

Advantageously, the two parts (A, B) of the mask are configured so as to provide a mutual centring during their fixing, in particular by clipping in one or two steps. Preferably, as will be described with the help of the figures, the clipping is carried out in two steps, at two fastening points and then at two other fastening points.

Preferably, the mask according to the invention comprises a partitioned peripheral wall, the partition or partitions constituting the wall or walls separating the cavities from one another.

Preferably, said reflector or portion of reflector which forms part of one of the parts (A) of the mask constitutes all or part of the rear wall of one of the cavities (2). It is for example a reflector which is associated with an indicating type bulb, a town light.

Preferably, the part (A) of the mask extending as a reflector or portion of reflector comprises at least one additional element giving it an additional functionality, in particular an optical one. It is, for example, an element intended to modify the light beam emitted by one of the bulbs, of the Fresnel lens type. It can also be an element intended to occult all or part of said light beam or part of the bulb itself, of the style occulter or screen type.

Said element is preferably connected to the part (A) of the mask by an arm with length and positioning such that the element is situated in line with the location of the bulb in the cavity delimited at least partly by said part (A) of the mask.

Advantageously, the parts (A, B) of the mask are each moulded in a single piece. As mentioned above, the parts (A, B) of the mask can each be aluminised so as to have an identical or on the contrary differentiated appearance.

According to one preferred embodiment, the mask is made in two parts (A, B) and defines two cavities, with:
- the part (B) comprising a majority portion of the peripheral wall of the mask in its entirety and comprising the partition separating the two cavities;
- the part (A) comprising a complementary portion of the peripheral wall of the mask and extending as a reflector or portion of reflector constituting all or part of the rear wall of one of the two cavities, and the base of which comes into contact with the back part of the partition of the part (B) of the mask.

Advantageously, according to this embodiment, the back part of the partition of the part (B) of the mask is provided with a portion of rear wall of the cavity, said portion delimiting an aperture, in particular a cylindrical one, through which the bulb can be introduced into the cavity. The portion of rear wall of the cavity around the aperture can be a portion of reflector in the continuation of the reflector of the part (A) of the mask.

Still according to this embodiment, the portion of rear wall of the cavity can be provided in front of the aperture with at least one wall in the shape of a sector of a cylinder, and in particular two. The portion of rear wall of the cavity can also be configured so as to provide it at the rear of the aperture with a portion of cylinder with the dimensions of said aperture and ending preferably with a cylindrical collar.

Preferably, the mask according to the invention comprises two parts (A, B) fixed to one another by clipping, by four fastening points constituted by as many lug/insert pairs. This then gives mounting in two stages: two pairs of inserts are inserted into two complementary lugs, then two other pairs of inserts are inserted into two other pairs of lugs while slightly "forcing" their relative positioning, so as to lock the two parts of the mask in position.

There can in particular be a mask defining at least two cavities, one cavity being provided with a bulb capable of fulfilling an illumination function of the high beam/low beam headlight and/or infrared illumination type, another cavity being provided with a bulb capable of fulfilling an indicating function of the town lamp or turn signal indicator type.

Another object of the invention is the complete lamp, which can comprise one or more of the masks according to the invention.

Another object of the invention is the motor vehicle equipped with at least one such device.

Figure 2B:
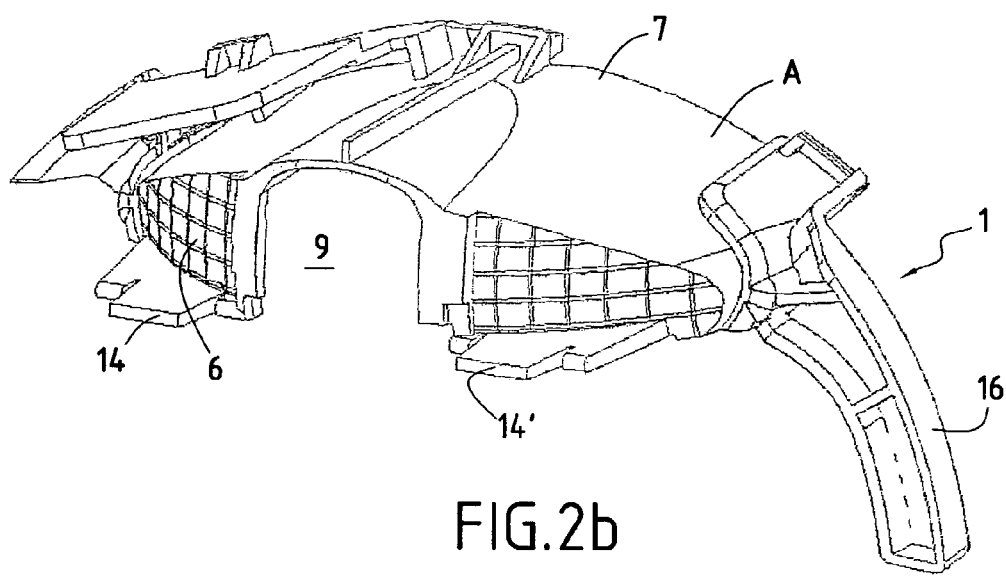

The invention will be described in more detail with the help of a non-limitative example embodiment illustrated by the following figures:

FIG. 1: the part B of the mask in a three-quarters front view (1a), and a three-quarters rear view (1b);

FIG. 2: the part A of the mask in a three-quarters front view (2a), and a three-quarters rear view (2b);

FIG. 3: the complete mask in a three-quarters front view (3a), and a three-quarters rear view (3b);

The figures are indicative and are not necessarily to scale.

FIG. 2 therefore shows from different angles the part A of the mask. It is a piece moulded out of PEI (polyether imide) which has been aluminised in a known manner. Any other suitable plastic material can be used instead of PEI, and in particular polycarbonate, PC. The piece comprises a portion of the peripheral wall 7 of the mask in its entirety as depicted in FIG. 3. It also comprises a portion of reflector 6 consisting here by way of example of a surface with rounded facets. It is also provided with an occulter element 9 of the style screen type, intended to hide the end of the bulb intended to be associated with this reflector. Although totally opaque and, in fact, metallised like the remainder of the part A, this screen has circular ridges in the manner of a Fresnel lens, for essentially aesthetic reasons. This screen is connected to the body of the part A in its area of portion of peripheral wall 7 by an arm 10 which has a length and positioning suitable for being in line with the top of the bulb once mounted. The reflector 6 is interrupted by an aperture at the rear of the screen 9. It is the part B of the mask which will optionally extend the reflector 6 of the part A as will be seen in FIG. 1. The part A is provided at the rear of the reflector 6 with a first pair of inserts 14, 14' which project in a plane substantially perpendicular to that in which the reflector 6 is situated. It is also provided with a second series of three inserts 15, 15', 15" which are in fact localised extensions towards the front of the portion of peripheral wall 7. The number and disposition of the inserts, which will cooperate with lugs of the part B of the mask, can of course be modified. The part A also comprises a wing 16 which facilitates its fixing to the part B of the mask, and which facilitates its gripping.

FIG. 1 shows from different angles the part B of the mask. It is moulded in one piece and made from PEI like the part A.

It comprises a majority portion of the peripheral wall 7 of the mask in its entirety, and the partition 8 which will separate the two cavities 2, 3 of the mask as depicted in FIG. 3. It comprises brackets 17, 18 for fixing to the remainder of the lamp. The whole of the perimeter 7 is in fact a double wall, the edge of the piece forming a fold. In order to cooperate with the pair of inserts 14, 14' of the part A, the part B comprises two lugs 19, 19'. The positioning of the inserts 14, 14' in the lugs 19, 19' constitutes the first step of fixing the part A to the part B of the mask, by a pivoting movement of A with respect to B. In order to cooperate with the series of three inserts 15, 15', 15" of A, the part B has no additional lugs: in fact it will be possible to slide the inserts, in a second step, with slight force, into the fold formed in the wall 7. Once the two fixing steps have been performed, the parts A and B are locked in their relative positioning. The base 10 of the reflector 6 of the part A then rests on the back part of the partition 8 of the part B, as shown in FIG. 3: the cavity 2 is therefore clearly delimited by the complementary nature of the shapes of the parts A and B of the mask 1. It is however easy to separate the parts A and B again if necessary. The part B also comprises a portion of wall 11 forming part of the rear wall of the cavity 2, and which extends the reflector 6 by also being locally in the form of a facetted metallised area 6'. This area 6' delimits an aperture 12, here cylindrical, which will make it possible to introduce the bulb into the cavity 2 and to house it therein. At the front of this aperture 12, there can be seen in FIG. 2 two sectors of cylinder 20, 20' which will, like the occulter 9, perform occultation with regard to the bulb. At the rear of the aperture 12, there is also a portion of cylinder 21 with dimensions close to those of the aperture 12 and sectors of cylinder 21, 21'. This portion of cylinder is hollow over its length and ends in a circular collar 23.

FIG. 3 therefore shows the mask 1 in its entirety, with the two cavities 2, 3 which it delimits. The cavity 2 is intended to be equipped with a town lamp, not depicted, and the cavity 3 is intended to be equipped with a high beam and/or low beam bulb. The mask therefore incorporates the reflector 6, 6' of the town lamp. It can be seen that the depth of the cavity 2 would have made metallisation of the complete mask difficult. With a mask in two parts, the metallisation is no longer a problem, even with deep cavities, even with projecting elements of the occulter type. The mask according to the invention is aesthetic since its mounting enables surface continuity on the one hand between the two areas acting as a mask of the parts A and B, and on the other hand between the area of the mask really acting as a mask and that acting as a reflector.

It lies within the scope of the invention to modify the size/relative configuration of the parts A and B of the mask, the distribution of their roles (for example by removing or increasing the area 6' of the part B supplementing the reflector 6 of the part A, by modifying the shape or size of the cavities 2, 3, etc.). The invention also relates to the mask independently of the lamp on which it is intended to be mounted, and each of the parts A and B of the mask taken separately.

What is claimed is:

1. A lighting and/or indicating device for a vehicle comprising a bezel constituting the perimeter of the side walls of at least two cavities which house at least one bulb in each of the cavities, wherein said bezel comprises at least first and second parts mechanically fixed to one another via a clipping system that fixes the parts of the bezel to one another and forms an integral part of said parts of the clipping system, said clipping system being substantially invisible once the bezel is mounted in said device, wherein at least one of the parts comprises a portion of a reflector.

2. The device according to claim 1, wherein the two parts of the bezel are configured so as to provide a mutual centering during their fixing.

3. The device according to claim 1, wherein said bezel comprises a partition separating the cavities from one another.

4. The device according to claim 1, wherein said portion of a reflector constitutes all or part of the rear wall of one of the cavities.

5. The device according to claim 1, wherein the first part of the bezel extending as the portion of the reflector comprises at least one element intended to modify the light beam emitted by one of the bulbs, of the Fresnel lens type, or intended to occult all of part of said light beam or part of the bulb itself, of the style occulter or screen type.

6. The device according to claim 5, wherein said element is connected to the first part of the bezel by an arm with length and positioning such that the element is situated in line with the location of the bulb in the cavity delimited at least partly by said first part of the bezel.

7. The device according to claim 1, wherein the parts of the bezel are each molded in a single piece.

8. The device according to claim 1, wherein the parts of the bezel are each aluminized so as to have an identical or differentiated appearance.

9. The device according to claim 3, wherein the second part of the bezel comprises a majority portion of the peripheral wall of the bezel in its entirety and comprises the partition separating the two cavities and wherein the first part comprises a complementary portion of the peripheral wall of the bezel and comprises a portion of a reflector, wherein the reflector comprises all or part of a rear wall of one of the two cavities, and a base of the rear wall comes into contact with a back part of the partition of the second part of the bezel.

10. The device according to claim 9, wherein the back part of the partition of the second part of the bezel is provided with a portion of rear wall of the cavity, said portion delimiting an aperture, in particular a cylindrical one, through which the bulb can be introduced into the cavity.

11. The device according to claim 10, wherein the portion of rear wall of the cavity around the aperture is a portion of a reflector in the continuation of the first part of the bezel.

12. The device according to claim 10, wherein the portion of rear wall of the cavity is provided in front of the aperture with at least one wall in the shape of a sector of a cylinder.

13. The device according to claim 10, wherein the portion of rear wall of the cavity is provided at the rear of the aperture with a portion of cylinder with the dimensions of said aperture and ending preferably with a cylindrical collar.

14. The device according to claim 1, wherein the bezel comprises two parts fixed to one another by clipping by four fastening points constituted by lug/insert pairs.

15. The device according to claim 1, wherein the bezel defines at least two cavities, one cavity being provided with a bulb capable of fulfilling an illumination function of the high beam/low beam headlight and/or infrared illumination type, another cavity being provided with a bulb capable of fulfilling an indicating function of the town lamp or turn signal indicator type.

16. The device according to claim 11, wherein the portion of rear wall of the cavity is provided in front of the aperture with at least one wall in the shape of a sector of a cylinder.

17. The device according to claim 11, wherein the portion of rear wall of the cavity is provided at the rear of the aperture with a portion of cylinder with the dimensions of said aperture and ending preferably with a cylindrical collar.

18. The device according to claim 12, wherein the portion of rear wall of the cavity is provided at the rear of the aperture with a portion of cylinder with the dimensions of said aperture and ending preferably with a cylindrical collar.

19. A lighting and/or indicating device for a vehicle comprising a bezel constituting the perimeter of the side walls of at least two cavities which house at least one bulb in each of the cavities, said bezel comprising at least first and second parts mechanically fixed to one another and a partition separating the cavities from one another, wherein the second part of the bezel comprises a majority portion of the peripheral wall of the bezel in its entirety as well as the partition separating the two cavities, and the first part comprises a complementary portion of the peripheral wall of the bezel and a portion of a reflector, the reflector comprising all or part of a rear wall of one of the two cavities and a base of the rear wall comes into contact with a back part of the partition of the second part of the bezel.

20. A lighting and/or indicating device for a vehicle comprising a bezel constituting the perimeter of the side walls of at least two cavities which house at least one bulb in each of the cavities, wherein said bezel comprises at least first and second parts mechanically fixed to one another, wherein at least one of the parts comprises a portion of a reflector, and the bezel comprises two parts fixed to one another by clipping by four fastening points constituted by lug/insert pairs.

* * * * *